April 17, 1951     I. L. ASHKENAS ET AL     2,549,044

ROLL CONTROL

Filed Oct. 12, 1946     2 Sheets-Sheet 1

INVENTORS
IRVING L. ASHKENAS.
THOMAS A. FEENEY.
BY Herbert E. Metcalf
Attorney

April 17, 1951  I. L. ASHKENAS ET AL  2,549,044
ROLL CONTROL

Filed Oct. 12, 1946  2 Sheets-Sheet 2

INVENTOR.
IRVING L. ASHKENAS
BY THOMAS A. FEENEY

Hubert E. Metcalf
Attorney

Patented Apr. 17, 1951

2,549,044

UNITED STATES PATENT OFFICE 2,549,044

ROLL CONTROL

Irving L. Ashkenas, Beverly Hills, and Thomas A. Feeney, Los Angeles, Calif., assignors to Northrop Aircraft, Inc., Hawthorne, Calif., a corporation of California Application October 12, 1946, Serial No. 703,040

7 Claims. (Cl. 244—90)

The present invention relates to airplane control and more particularly to a system for efficiently producing rolling moments by the use of spoiler surfaces. The term "spoiler" as used herein is defined as meaning a surface or plate projectible through a wing surface of an airplane to interrupt the normal air flow thereover and thereby reduce wing lift.

The present application is an improvement on the Ashkenas Patent No. 2,402,118, issued June 18, 1946, for Roll Control for Airplanes.

In the patent referred to above a system utilizing spoilers for roll control is described and claimed wherein an auxiliary surface on the airplane movable into an airstream is used for providing pilot "feel" and a restoring force for a projected spoiler, because most spoilers have a very small positive, or even a negative, restoring force when projected. In the application cited above, it was also pointed out that spoilers could be advantageously used for the entire control in roll of an airplane, if desired.

Upon further investigation of spoiler action for roll control in airplanes, we have found that plain spoilers, when projected through the wing surface in linear response to the movement of the pilot's roll control means, do not, without the use of compensating moment producing devices, produce rolling moments linearly related to the control movement. The moments increase at less than linear rate as the spoiler is linearly projected, and then gradually increase in rate until at about one-third of the total spoiler projection the moments become substantially linear with spoiler projection. This early non-linear effect is due to the fact that at small projections of the spoiler the airflow quickly reestablishes itself over the upper wing surfaces behind the spoilers, and for small projections the loss of lift due to the spoiler action is too small to create a significant rolling moment. While there is no objection to such a non-linear relation of moment to projection distance from an aerodynamic point of view, there has been a definite objection to such a relationship from the pilot's point of view, in that the pilot has to make a relatively large movement of his roll control means in order to create a substantial rolling moment on the airplane.

Several methods have been previously proposed to obtain rolling moments increasing linearly with the motion of the pilot's roll control near neutral position. The most obvious of such methods is to project the spoilers rapidly at first and more slowly thereafter, with a special linkage to the pilot's control to accomplish this end. Such an arrangement, however, is again not satisfactory to the pilot because of the inertia of the spoilers, which, even in relatively small airplanes, are long and relatively heavy. In consequence, rapid acceleration of the spoilers near neutral position requires the exertion of a pilot force that is different from that required when the spoilers are more extended. A substantial change in rate of projection of the spoiler, particularly near neutral as when shifting from the withdrawal of the spoiler on one wing to the projection of a spoiler on the other wing imparts a decidedly objectionable feel or "bump" to the control column, which is entirely different from normal aerodynamic feel. It is, therefore, an object of the present invention to provide rolling moments primarily produced by spoiler projections that are substantially linearly related to the movement of the pilot's roll control and which will not "bump" the pilot control in any substantial manner when transferring the projection of spoilers from one wing to the other, i. e., when passing through neutral position.

In one arrangement embodying the present invention, a very small aileron is used positioned adjacent each wing tip, and coupled to the spoiler on the same wing in such a manner as to provide a high rate of deflection before the spoiler has been projected a substantial distance above the upper wing surface. The aileron used is, of course, too small by itself to effectively control the airplane in roll, but the additional rolling moment produced is sufficient at small projections of the spoiler to augment the rolling moments of the spoiler during the first part of its travel and thus provide a combined rolling moment that is substantially linear with pilot control movement.

It will be noted that when small ailerons are used in conjunction with the spoilers the positive restoring force of the ailerons can also be used, if desired, to provide true pilot feed to the controls and will give an over-all positive neutralizing force to the system in the same manner as described and claimed in the patent cited above.

One of the advantages of the present invention is that because only a small aileron is needed a large extent of the trailing edge of the wings can be used for high lift flaps, thus making possible a low landing speed.

In another aspect the present invention involves the use of spoilers which are so arranged as to move in both directions from the neutral position. From a strictly aerodynamic point of view there is some small advantage in having the spoiler not in use remain with its upper surface flush with the upper wing surface on which the spoiler is mounted. Under these conditions, the upper edge of the spoiler will substantially close the spoiler slot. From the pilot's point of view, however, such an arrangement is not advantageous because of the over-all mechanical unbalance of the system in that the spoilers have to be accelerated from the stationary neutral position in passing from the projection of one spoiler to the projection of the other. This again causes a "bump" in pilot force required and is disliked by pilots.

We have found, however, that the aerodynamic disadvantage of having the spoiler slots open when the spoiler is not in use is extremely small when thin spoiler plates are utilized, and therefore to provide better mechanical balance to the system we have found it advantageous to permit the spoiler not in use to rotate within the wing, preferably to the same angle downwardly as the spoiler can be projected upwardly. If the wing is not thick enough to permit full downward rotation, it has still been found to be highly advantageous to permit one spoiler to be withdrawn as far within the wing as possible when the other spoiler is being projected. It has been found that when the downward angle approaches about one-half that of the upward angle the system does not impart undesirable out-of-balance forces to the pilot control. In addition, it has been found advantageous in many cases to provide spoilers with counter-weights for additional smoothness of operation.

Having described the objects and advantages of the present invention, reference can now be made to drawings in which the two embodiments described will be illustrated.

Figure 1:
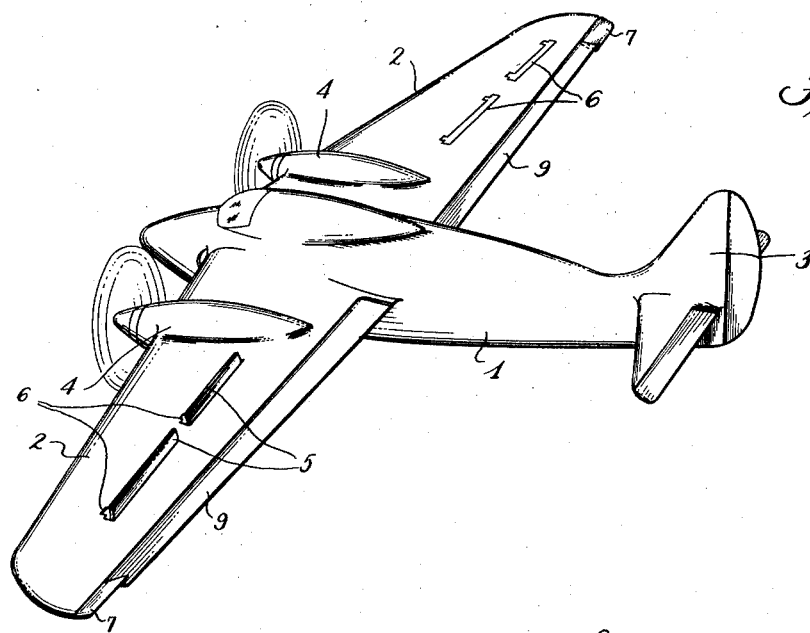
Figure 1 is a diagrammatic perspective view of an airplane utilizing one preferred embodiment of the present invention.

Referring to the drawings, and referring first to Figure 1, the invention is shown as applied to a conventionalized twin-engine, high-speed fighter type airplane. In airplanes of this type high maximum speed and low landing speed with high maneuverability at all speeds are requirements which are obtained by the use of the invention as shown. In this particular embodiment the airplane comprises a fuselage 1, wings 2, empennage 3, and propulsion units 4. The control system for this airplane comprises a pair of spoilers 5, movable to project above the upper surface of each wing through spoiler slots 6, together with small wing tip ailerons 7 positioned in the trailing edge of each wing at the tips thereof. The remainder of the trailing edge of the wings is used by long, almost full span high lift flaps 9.

The spoilers 5 are preferably positioned in the aft 40% of the wing, i. e., 60% or more of the chord length back from the leading edge of the wing. The time lag of response when such surfaces are extended from the main wing contour is completely satisfactory at all speeds and at all flight attitudes, being in the neighborhood of .1 second for average cruising positions. By utilizing the region of the wing to the rear of the 60% chord point it is possible to select a location of the spoilers sufficiently far forward from the trailing edge of the wing to clear the landing flaps and their associated mechanisms, making it possible to utilize almost the entire length of the wing, if desired, for the spoiler surfaces.

It has been found that when long span spoilers are utilized, located in front of the high lift flaps, they will operate satisfactorily for roll control when the high lift flap is moved downwardly for landing or other purposes.

Figure 2:
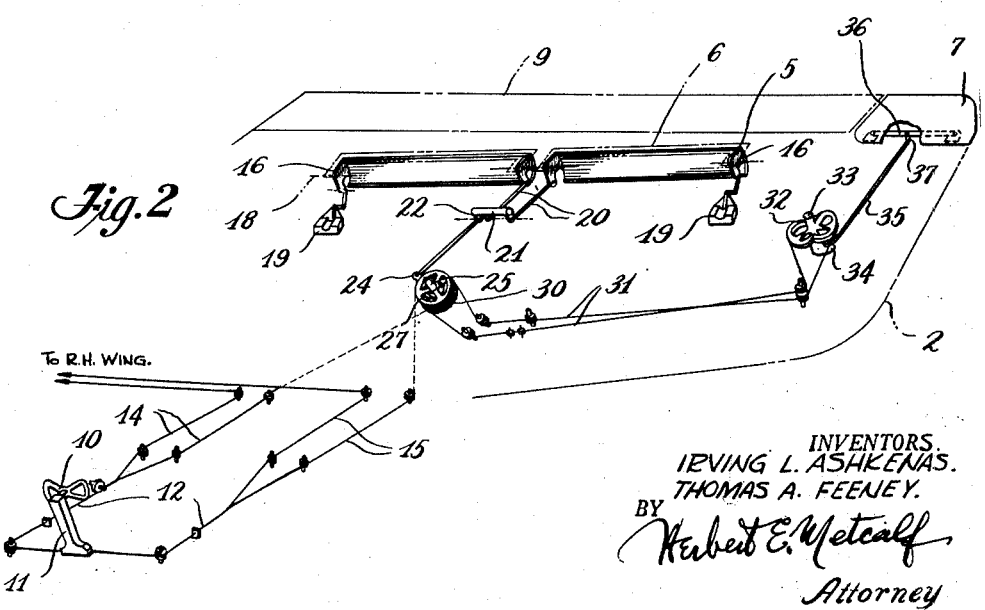
Figure 2 is a diagrammatic perspective layout view of one side of the roll control system as used on the airplane of Figure 1.

Obviously, to obtain proper control in roll, the spoilers on one wing of the airplane are to be projected without projecting the spoilers on the other wing, in order that an unbalanced lift will occur to cause the spoiled wing to fall. One means of controlling the spoilers in this manner is shown in Figure 2. Here an aileron wheel 10 is conventionally mounted on a standard control column 11 to operate a pair of roll control cables 12 which are then split into two cables 14 on one side and 15 on the other side, these cables then being cross-connected to opposite spoilers.

The spoilers 6 are cylindrically-shaped plates having an arc of about 60°, and are rotated on end arms 16 about an axis indicated by a line 18, positioned just below the top wing surface. In practice, the spoiler plates are preferably made of magnesium about one-quarter inch thick to reduce weight, and when installed are customarily counterbalanced by balancing weights 19 attached to outer arms 16. Two adjoining arms 16, provided with tie rods 20, are attached to lever assembly 21, one arm 22 of which is connected to lever 24 mounted on pulley shaft 25. One cable 14 and one cable 15 are lead along the wing over pulleys to pass around a cable wheel 27 mounted on shaft 25.

As the cable connections on the opposite wing of the airplane are crossed it will be seen that as one set of spoilers on one wing moves upwardly into the air stream, the spoilers on the opposite wing will be withdrawn within the wing in opposite sense. The lever characteristics of lever assembly 21 in the embodiment described are such that when the spoilers on one wing are projected upwardly about 60° the spoilers on the other wing will be drawn into the wing about 30°. This relationship will be discussed later.

In the arrangement described, it will also be noted that the projection of the spoilers above the top surface of the wing is substantially linear with control wheel rotation. However, as before pointed out, it has been found that when the projection of the spoilers above the wing is linearly related to the rotation of the aileron control wheel, the rolling response is not linear. While it is quite possible to control the airplane with the spoilers linked in this manner, it means that the pilot must move his aileron control wheel very rapidly and relatively far from neutral position to obtain fast acting rolling moments. Such wide throw of the aileron control wheel is not considered advisable from the pilot's point of view. It is, therefore, highly advantageous to provide a system where the rolling moment itself is substantially proportional to the movement of the control wheel, irrespective of the amount of the projection of the spoilers.

In consequence, the rolling moment produced by the erection of the spoilers during the first portion of their travel above the wing surface is augmented in a very satisfactory manner by the use of the small ailerons 7 which are linked with the spoilers and operated simultaneously. The ailerons utilized are far too small to completely control the airplane in roll and are so arranged that they operate both above and below neutral position with a higher rate of deflection near neutral than when approaching full deflection. As the ailerons are small and light, bumping of the controls due to the increased rate of aileron deflection near neutral is far smaller than could be obtained if the spoilers themselves were to be rapidly accelerated near neutral position.

The desired simultaneous aileron action is obtained by the use of an aileron pulley wheel 30 attached to shaft 25 operating aileron control cables 31 which are in turn attached to aileron control cables 31 which are in turn attached to aileron cable sectors 32 mounted on aileron shaft 33. Aileron shaft 33 is provided with a lever arm 34 to which is attached an aileron operating rod 35 passing through the wing and connected to aileron axle 36 by an axle lever 37. Levers 34 and 37 are positioned to be in parallel planes with the aileron 7 in neutral position, and in consequence the deflection of the aileron occurs at a higher rate when levers 34 and 37 are close to the 90° relationship with operating rod 35. The rate of deflection of aileron 7 then decreases as the levers tend to become parallel with rod 35.

The rolling moment of aileron 7 is thus made additive to the rolling moment of the spoilers at small projections and, of course, is also additive at all projections of the spoiler, but at small projections the rolling moment is predominantly aileron produced. However, the rolling moment produced by the spoilers increases rapidly over that capable of being produced by the ailerons as the spoilers are projected higher and higher, and the greater part of the total rolling moment at high projections of the spoilers is produced by the spoilers. It will be noted that the aileron-spoiler combination just described also accomplishes the result described in the patent cited above, in that the airflows over ailerons 7 act to produce a positive restoring force to the system, so that when the control wheel is released both ailerons seek their normally trailing position, and thus return the spoilers to substantially neutral positions on both sides of the airplane. The system herein described is not limited by such a linkage, as power operation of both spoilers and ailerons may be used, if desired, and the advantages of the present invention obtained.

Figure 4:
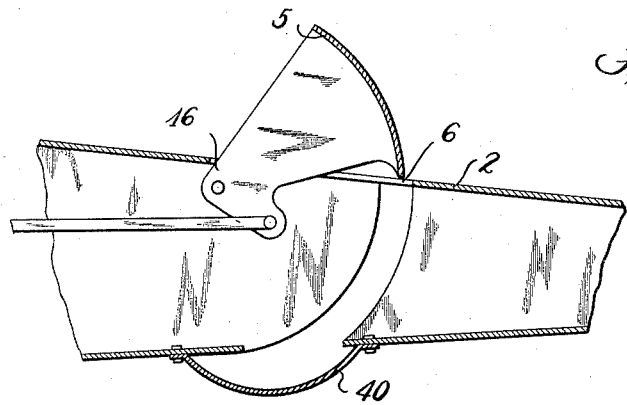
Figure 4 is a diagrammatic cross-sectional view of a spoiler as projected above the wing.
Figure 5:
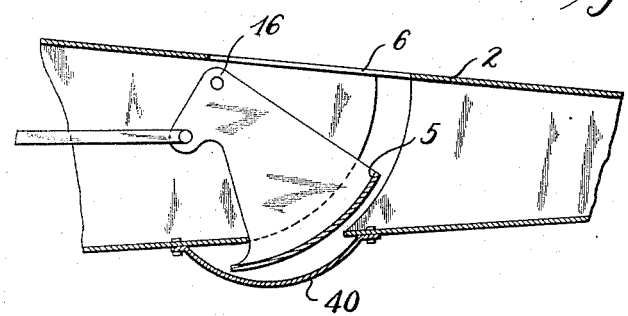
Figure 5 is a diagrammatic cross-sectional view of a spoiler retracted into the wing.

For the same reason that it is not desirable to rapidly accelerate the spoilers upwardly near a neutral position of the control wheel, it is likewise not desirable to hold the spoilers on one wing stationary while projecting the spoilers on the other wing. Such a procedure will again "bump" the pilot when passing through the neutral position because the spoilers on the wing not in use must be picked up from their stationary neutral position and rapidly accelerated upwardly. It is, therefore, desirable to have the spoilers on one wing move into the wing as the spoilers on the other wing move upwardly. The ideal condition would be to have the spoilers in one wing move into the wing with the same arc of travel as the spoilers on the other wing move upwardly. However, in airplanes having high-speed characteristics such as fighter airplanes, the wing may not be thick enough to permit downward travel equal to upward projection. In the case of the system just above described, the upward travel on one wing is about 60°, as shown in Figure 4, whereas the downward travel on the other wing is only about 30°, as shown in Figure 5.

Figure 3:
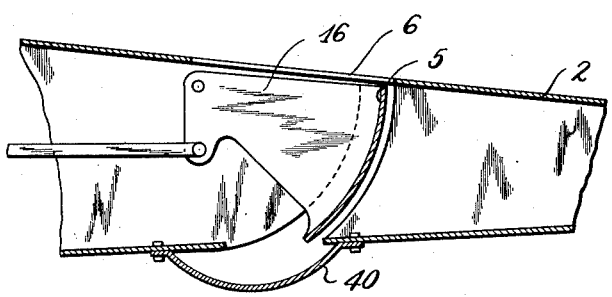
Figure 3 is a diagrammatic cross-sectional view of a spoiler in neutral position in the wing.

From an aerodynamic point of view, it would be slightly advantageous to have the spoilers remain with their top surface flush with the upper wing surface as shown in Figure 3, inasmuch as the upper edges of the spoiler plates then practically close the spoiler slots. However, it is found that when thin spoiler plates are used, such as the one-quarter inch magnesium plates mentioned, the opening at the top surface slot, due to the disappearance of the spoiler within the wing, is not aerodynamically significant. Furthermore, in thin wings, such as hereabove described, it is not always possible to move spoilers even 30° downwardly without the lower end of the spoiler passing through the lower wing surface. The advantages to the pilot, however, of permitting about half of the upward travel in the downward travel of the spoilers in opposite wings is so marked that it has been found desirable to permit the spoilers to project below the wing surface at full retraction. The lower slot is then covered with a fairing 40 as shown in Figures 3, 4, and 5.

Aerodynamically, the drag of such a fairing on the lower wing surface is insignificant compared to the advantages to the pilot in having the spoilers moving in opposite directions as the control wheel passes through neutral. It will be noticed that the forces imposed on the wheel due to the shorter downward travel are mostly exerted at the extremes of wheel control movement, rather than near neutral position thereof.

That the invention herein described is highly satisfactory in practice has been proved by its use on the U. S. Army P-61 night fighter, known as the "Black Widow," having the following characteristics:

Length of wing panel _____ 371 in.
Span length of panel landing
  flap _____ 250 in.
Span length of panel aileron _ 57 in.
Length of panel spoilers _____ 134 in.
Speed _____ About 400 M. P. H.
Landing speed _____ About 100 M. P. H.

We claim:

1. A roll control system for airplanes comprising a spoiler member projectable above the upper surface of each wing adjacent the outer end thereof and contoured to provide a rolling moment non-linear with respect to projection distance, control means connected to said members, said control means including means differentially projecting and retracting said members linearly with respect to movements of said control means, an aileron hinged to said airplane and positioned to provide a rolling moment substantially linear with respect to deflection when deflected, and means connecting said aileron to said control means to deflect said aileron non-linearly with respect to movement of said control means at rates providing a total rolling moment substantially linear with respect to movement of said control means.

2. A roll control system for an airplane comprising an aileron positioned adjacent each wing tip of said airplane and movable from a neutral position to provide roll control of said airplane, a spoiler normally movable to be projected above the upper surface of each wing from a neutral position and positioned inboard of said ailerons, a pilot control means, a first linkage linking said spoilers with said pilot control means to project a spoiler above the upper surface of one wing without projecting the spoiler above the upper surface of the other wing to provide roll control, said first linkage being proportioned to project said spoiler linearly with respect to the movement of said pilot's control, a second linkage linking said pilot's control means to said ailerons moving said ailerons in a direction to provide a rolling moment additive to the rolling moment produced by the projected spoiler, said second linkage being proportioned to deflect said ailerons away from neutral non-linearly with respect to the movement of said pilot control means.

3. A roll control system for an airplane comprising an aileron positioned adjacent each wing tip of said airplane, and movable from a neutral position to provide roll control of said airplane, a spoiler normally movable to be projected above the upper surface of each wing from a neutral position, and positioned inboard of said ailerons, a pilot control means, a first linkage linking said spoilers with said pilot control means to project a spoiler above the upper surface of one wing without projecting the spoiler above the upper surface of the other wing to provide roll control, said first linkage being proportioned to project said spoiler linearly with respect to the movement of said pilot's control, a second linkage linking said pilot's control means to said ailerons moving said ailerons in a direction to provide a rolling moment additive to the rolling moment produced by the projected spoiler, said second linkage being proportioned to deflect said ailerons away from neutral non-linearly with respect to the movement of said pilot control means, said second linkage being proportioned to provide the highest rate of movement of said ailerons adjacent the neutral position thereof.

4. Apparatus in accordance with claim 3 wherein said spoilers are mounted to move both above and below said upper surface and wherein said first linkage includes means connected to move said spoilers both above and below said upper surface but over a lesser distance below said surface.

5. Apparatus in accordance with claim 3 wherein said spoilers are cylindrically shaped plates mounted to rotate about a laterally extending axis positioned just below said upper wing surface, with the concavity of said spoilers facing forward.

6. Apparatus in accordance with claim 5 wherein said first linking means includes means for moving the tops of said spoilers upwardly above one of said upper wing surfaces over an arc of about 60° and below the other upper wing surface over arc of about 30°.

7. Apparatus in accordance with claim 6 wherein the cylindrical arc of said spoiler plates is about 60°.

IRVING L. ASHKENAS.
THOMAS A. FEENEY.

REFERENCES CITED

The following references are of record in the file of this patent:

UNITED STATES PATENTS

| Number | Name | Date |
|---|---|---|
| 1,616,682 | Clark | Feb. 8, 1927 |
| 1,723,653 | Lybrand | Aug. 6, 1929 |
| 1,858,259 | Alfaro | May 17, 1932 |
| 2,329,177 | Baker | Sept. 14, 1943 |